US006739176B2

(12) United States Patent  (10) Patent No.: US 6,739,176 B2
Neuhausen et al.  (45) Date of Patent: May 25, 2004

(54) PROCESS FOR CHECKING THE OPERABILITY OF AN EXHAUST GAS PURIFICATION CATALYST

(75) Inventors: Ulrich Neuhausen, Krefeld (DE); Harald Klein, Glattbach (DE); Egbert Lox, Hochwaldhausen (DE); Jürgen Gieshoff, Biebergemünd (DE); Thomas Kreuzer, Karben (DE)

(73) Assignee: DMC2 Degussa Metal Catalysts Cerdec AG, Frankfurt am Main (DE)

( * ) Notice: Subject to any disclaimer, the term of this patent is extended or adjusted under 35 U.S.C. 154(b) by 12 days.

(21) Appl. No.: 09/809,355

(22) Filed: Mar. 16, 2001

(65) Prior Publication Data

US 2001/0033815 A1 Oct. 25, 2001

(30) Foreign Application Priority Data

Mar. 21, 2000 (DE) .......................... 100 13 893

(51) Int. Cl.$^7$ ............................. G01M 15/00
(52) U.S. Cl. ................................... 73/23.31
(58) Field of Search .................. 73/23.31, 23.32, 73/118.1, 118.2, 25.01, 116, 31.06; 60/274, 275, 276, 277, 285, 270; 701/109, 103, 101

(56) References Cited

U.S. PATENT DOCUMENTS

| | | | |
|---|---|---|---|
| 5,175,997 A | 1/1993 | Blanke, Sr. | |
| 5,259,189 A | 11/1993 | Baier et al. | |
| 5,732,551 A | 3/1998 | Naber et al. | |
| 5,941,918 A | 8/1999 | Blosser | |
| 6,301,881 B1 * | 10/2001 | Kumar | 60/274 |

FOREIGN PATENT DOCUMENTS

DE 4 039 429 6/1992

\* cited by examiner

*Primary Examiner*—Evan Pert
*Assistant Examiner*—Monica D. Harrison
(74) *Attorney, Agent, or Firm*—Kalow & Springut LLP

(57) ABSTRACT

A process for checking the operability of an exhaust gas purification catalyst for diesel engines, which has a light-off temperature and a degree of conversion $r_{CO}$ for carbon monoxide (CO), by direct measurement of the carbon monoxide concentration in combination with a temperature measurement. To evaluate the remaining catalytic activity of the catalyst the difference $\Delta T$ between the current catalyst exit temperature $T_E$ of the exhaust gas and the light-off temperature $T_{CO,50\%,fresh}$ of the fresh catalyst for carbon monoxide stored as a function of the speed and load $$\Delta T = T_E - T_{CO,50\%,fresh}$$

is determined and the degree of conversion $r_{CO}$ for carbon monoxide is ascertained.

8 Claims, 6 Drawing Sheets

PROCESS FOR CHECKING THE OPERABILITY OF AN EXHAUST GAS PURIFICATION CATALYST

INTRODUCTION AND BACKGROUND

The present invention relates to a process for checking the operability and effectiveness of a catalyst for purification of the exhaust gases of a combustion engine. The process is particularly suitable for monitoring a diesel oxidation catalyst. The operability of the catalyst is monitored according to the invention by measuring the conversion of carbon monoxide in combination with a temperature measurement. The process is also suitable for monitoring the operability of catalysts for the HC-DeNO$_X$ process and the urea-SCR process and for NO$_X$ adsorber catalysts,.

For motor vehicles with a gasoline engine it is obligatory to monitor the functioning of all the exhaust gas-relevant components of the exhaust gas system during operation of the vehicle by an on-board diagnosis system (OBD system). Malfunctions of one or more components of the exhaust gas system are indicated by a warning lamp lighting up. In the case of vehicles fitted with a catalytic converter for aftertreatment of the exhaust gases, the operability of the converter must also be monitored by the OBD system.

In the future it will be necessary for diesel motor vehicles also to be fitted with an OBD system. In addition to recycling of the exhaust gases and the exhaust system, the OBD system will also include monitoring of diesel particulate filters, and in particular of diesel oxidation catalysts. In the case of vehicles with gasoline engines, an indirect OBD process is employed for monitoring three-way catalysts, in which the oxygen storage capacity of the catalyst is measured and evaluated. This process cannot be used on diesel engines, sine these are always operated with excess oxygen, that is to say with a lean air/fuel mixture.

An object of the present invention is therefore to provide a process for checking the operability of an exhaust gas purification catalyst which is also suitable for checking the functioning of oxidation catalysts for diesel engines and allows determination of the catalyst activity directly via measurement of the conversion of carbon monoxide (CO).

SUMMARY OF THE INVENTION

The above and other objects of the present invention can be achieved by a process described herein which is characterized by fining a combustion engine with an electronic control system comprising engine electronics and OBD electronics, and evaluating the remaining catalytic activity of the catalyst by determining the difference $\Delta T$ between the current catalyst exit temperature of the exhaust gas $T_E$ and the start-up temperature for carbon monoxide $T_{CO,50\%, fresh}$ of the fresh catalyst or new catalyst at the particular operating point of the engine by the equation $$\Delta T = T_E - T_{CO,50\%, fresh}$$

and evaluating the degree of conversion for $r_{CO}$ carbon monoxide.

In the context of this invention the light-off temperature for carbon monoxide oxidation is understood as meaning that temperature $T_{CO,50\%}$ at which carbon monoxide is just converted to the extent of 50%.

According to the invention the catalytic activity still remaining after a certain operating time is evaluated directly. Characteristic parameters for this are the degree of conversion $r_{CO}$ for carbon monoxide, the current catalyst exit temperature of the exhaust gases $T_E$ and the light-off temperature of the fresh catalyst for CO, $T_{CO,50\%, fresh}$, which is a function of the engine speed and the load and can be pre-stored in the OBD electronics.

The degree of conversion $r_{CO}$ for carbon monoxide can be determined according to the following relationship $$r_{CO} = 1 - \frac{c_{CO,2}}{c_{CO,1}}, \quad (2)$$

wherein $c_{CO,2}$ is the concentration of carbon monoxide in the exhaust gas measured downstream of the catalyst and $c_{CO,1}$ is the concentration of carbon monoxide in the exhaust gas measured upstream of the catalyst.

Alternatively, there is the possibility of determining the degree of conversion $r_{CO}$ for carbon monoxide according to the following relationship $$r_{CO} = 1 - \frac{c_{CO,2}}{c_{CO,engine}}, \quad (3)$$

wherein CCO,2 is the concentration of carbon monoxide in the exhaust gas measured downstream of the catalyst and $C_{CO,engine}$ is the carbon monoxide concentration at the current engine operating point stored as an engine map in the OBD electronics.

In both cases the carbon monoxide concentrations can be measured with the aid of carbon monoxide sensors.

BRIEF DESCRIPTION OF THE DRAWINGS

The invention will now be explained in more detail with the aid of FIGS. 1 to 6. In the figures

DETAILED DESCRIPTION OF THE INVENTION

Figure 1:
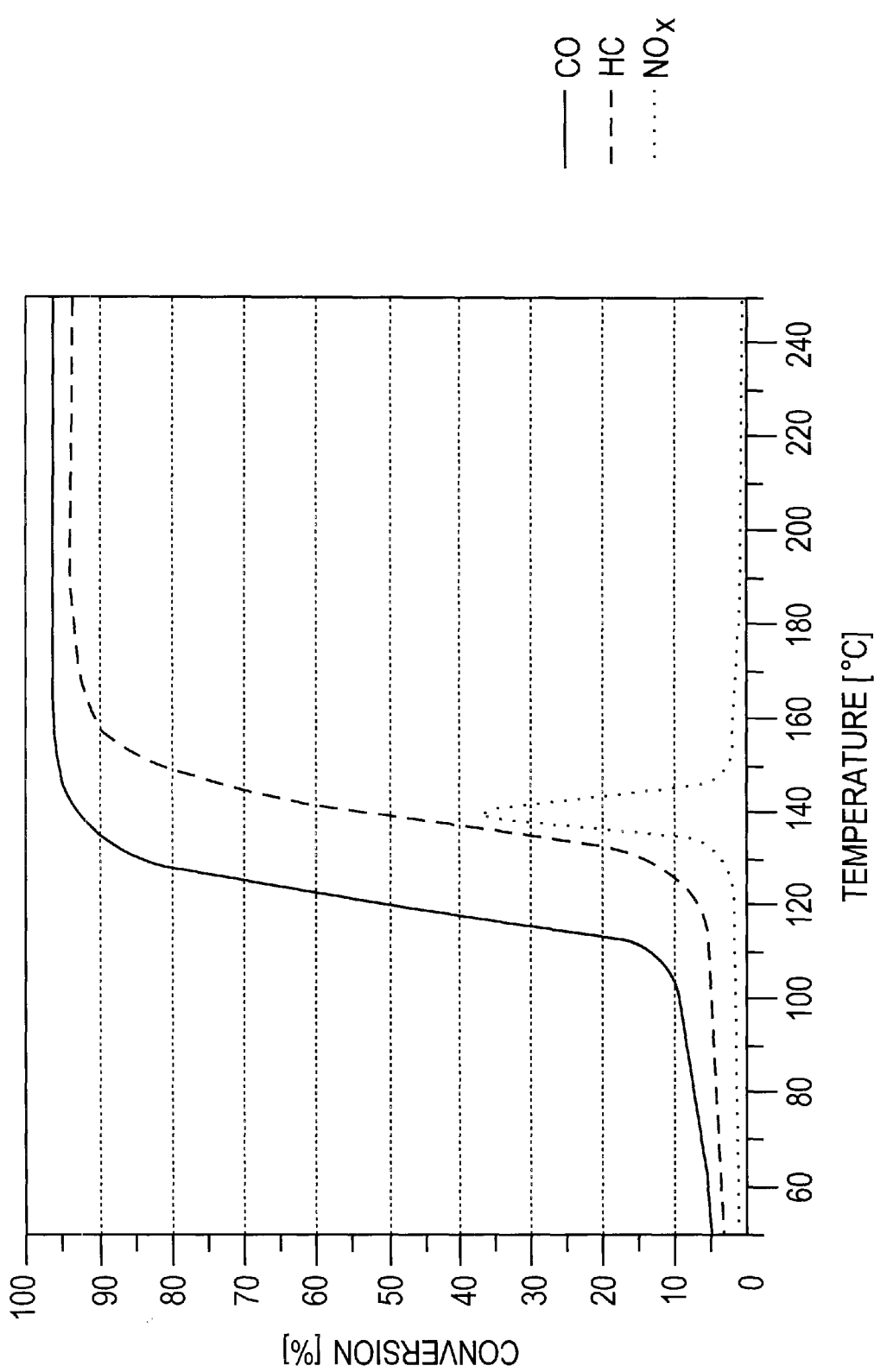
FIG. 1 is a graph which shows the temperature dependence of the pollutant conversion of a fresh catalyst for the hydrocarbons (HC), nitrogen oxides (NOx) and carbon monoxide (CO) contained in the exhaust gas of a diesel engine.

The pollutant conversion of a catalyst depends, up to a maximum conversion degree, on its temperature. A catalyst shows a different temperature course of the pollutant conversion for each of the three main gaseous pollutants CO, HC (hydrocarbons) and NOx (nitrogen oxides). The degree of conversion for CO, HC and NOx of a fresh diesel oxidation catalyst as a function of the exhaust gas temperature in front of the catalyst are shown in FIG. 1 as an example.

For carbon monoxide and hydrocarbons, the conversion increases sharply in a narrow temperature range around the start-up or light-off temperature in question, $T_{CO,50\%}$ and $T_{HC,50\%}$ respectively, and then approaches the maximum degree of conversion. In the case of diesel oxidation catalysts the conversion for nitrogen oxides at low temperatures is close to zero. It reaches a maximum in the region of the light-off temperature for hydrocarbons $T_{HC,50\%}$ and falls again to close to zero at high catalyst temperatures.

As the use time of the catalyst increases its catalytic activity decreases due to thermal overstrain and poisoning, for example by sulphur compounds, phosphorus compounds and heavy metal compounds in the exhaust gas, which either originate from the fuels and lubricants used or are attributed to abrasion in the engine. Ageing of the catalyst manifests itself by a gradual increase in its light-off temperatures, and with progressive damage additionally by a reduction in the maximum conversions at high temperatures. The conversion curves of a diesel oxidation catalyst aged by continuous operation are shown in FIG. 2 as an example.

Figure 2:
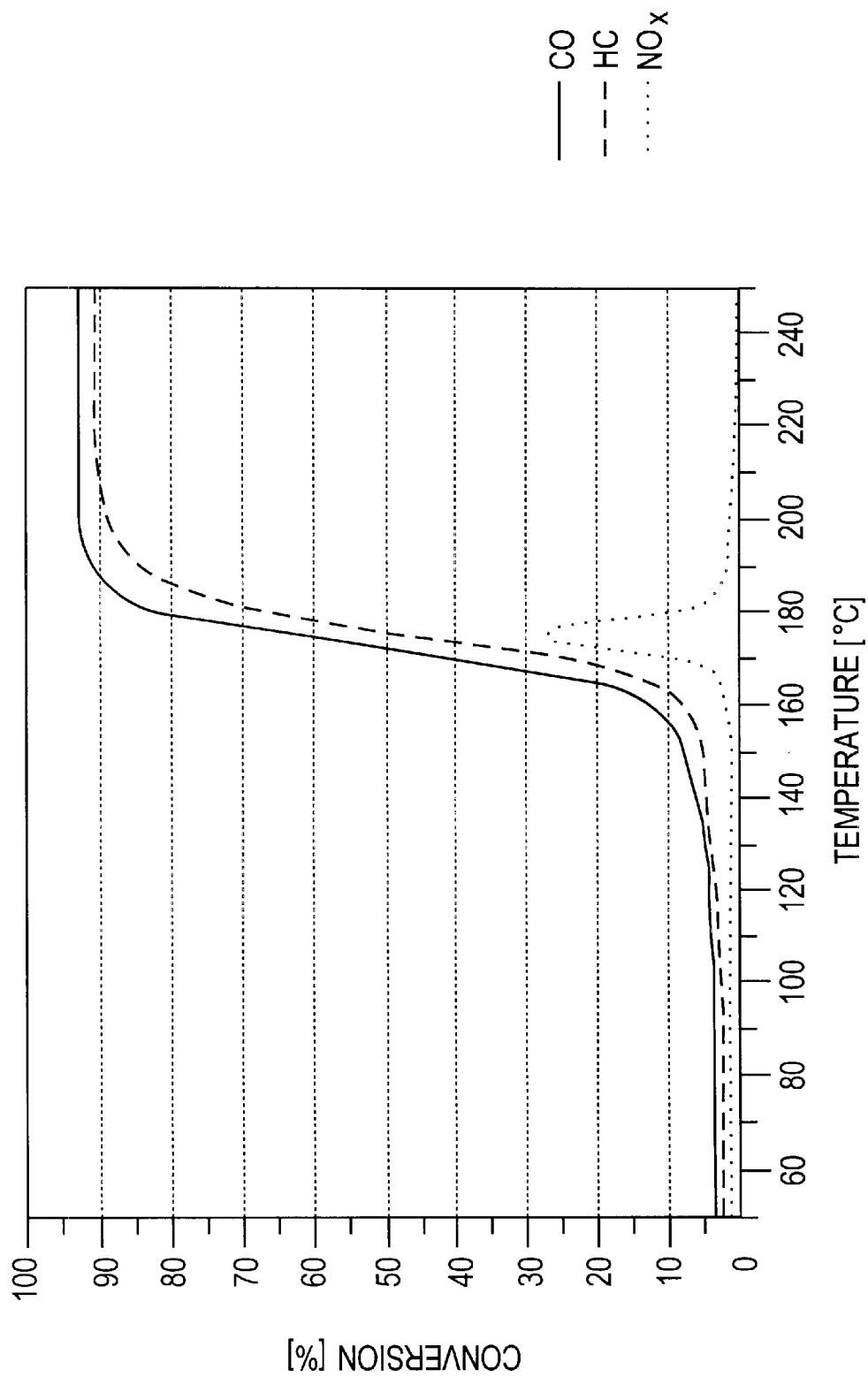
FIG. 2 is a graph which shows the temperature dependence of the pollutant conversion of an aged catalyst for the hydrocarbons (HC), nitrogen oxides (NOx) and carbon monoxide (CO) contained in the exhaust gas of a diesel engine.

CO oxidation has proved to be particularly critical with respect to ageing effects in diesel oxidation catalysts (FIG. 2). The evaluation of catalysts via the CO oxidation capacity is therefore so particularly suitable for diesel applications because current diesel oxidation catalysts and future diesel exhaust gas after-treatment systems (HC-DeNO$_x$, NO$_x$ adsorbers, urea-SCR) are to the greatest extent based on platinum as the catalytically active material. The activity of the platinum catalysts in all cases depends very greatly on the particle size of the platinum. The deterioration in the activity of the catalysts after ageing is to be attributed to an increase in the size of the catalytically active platinum particles and the accompanying loss of catalytically active surface area. CO oxidation is the reaction which records these changes very accurately. If the temperature difference $\Delta T$ of equation (1) chosen is large enough to rule out misdiagnosis, the deterioration in the carbon monoxide oxidation capacity and therefore the increase in the start-up or light-off temperature $T_{CO,50\%}$ for carbon monoxide is a universal means for determination of the activity of diesel catalysts.

The choice of CO as the indicator pollutant for on-board diagnosis rather than HC furthermore has the advantage that it is a clearly defined chemical compound which is identical at all the operating points of the engine. HC is a substance mixture, the composition of which depends on the operating point of the engine. Exact recording by measurement is therefore more complicated compared with CO. Another advantage of CO as the indicator pollutant rather than HC lies in the varying definition of emission limit values according to European emission legislation. While there are separate limit values for CO, NOx and particles, the limit values for HC are defined only for the total of HC and NOx. The HC emission which can be tolerated therefore depends on the current NOx emissions. The choice of HC as the sole indicator pollutant is therefore unfavourable.

The carbon monoxide concentration $c_{CO,2}$ in the exhaust gas located behind the catalyst is determined according to the invention by a carbon monoxide sensor installed in the exhaust gas strand located downstream from the converter.

The carbon monoxide concentration $c_{CO,1}$ upstream of the catalyst can also be measured directly with a carbon monoxide sensor or can be obtained from the values pre-stored in the form of mappings in the OBD electronics for each operating point of the engine. For this purpose, the raw emissions of the engine type used are determined beforehand for all the operating points of the engine and are stored in the OBD electronics as concentration values as a function of the speed and load. The concentration values obtained from the memory of the OBD electronics, which correspond to the raw emission values of the engine, are designated $c_{CO,engine}$ in the following. The degree of conversion of the pollutant in this case is thus calculated according to equation (3).

During operation of the vehicle the engine operating data, that is to say the operating point existing during the measurement and calculation, are transmitted continuously from the engine electronics to the OBD electronics.

According to the invention, to evaluate the condition of the catalyst the current exhaust gas temperature $T_E$ after the catalyst is measured by a temperature sensor and the degree of conversion $r_{CO}$ for carbon monoxide is determined for the corresponding temperature. The determination of $r_{CO}$ according to equation (3) from $c_{CO,2}$ and the data $c_{CO,engine}$ stored as mappings in the OBD electronics has the advantage here, in addition to the favourable costs, over measurement of the two concentration values that the quotient of two sensor signals of very different size does not have to be obtained. Furthermore, if two sensors are used the sensor in front of the catalyst is constantly exposed to a different gas atmosphere to the sensor after the catalyst, which would lead to different ageing of the sensors, which would have to be taken into account when calculating the degree of conversion.

The temperature is measured behind the catalyst to ensure that during dynamic driving operation the exhaust gas temperature measured corresponds to the actual catalyst temperature. This would not be ensured with measurement of the exhaust gas temperature in front of the catalyst, because of its thermal inertia during cold start, and with rapid changes in load.

For the evaluation of the catalyst, it is not the absolute level of its temperature which is decisive, but the difference $\Delta T$ between the current catalyst exit temperature and the CO start-up or light-off temperature of the fresh catalyst $\Delta T = T_E - T_{CO,50\%,fresh}$. The light-off temperature $T_{CO,50\%,fresh}$ is a function of all the pollutant concentrations, that is to say the raw emissions of the engine, and the space velocity in the catalytic converter. The raw emissions of the engine and the space velocity within the converter are functions of the load and engine speed. The light-off temperatures $T_{CO,50\%, fresh}$ for all operating points of the engine are therefore stored in the form of mappings in the OBD electronics as a function of the load and engine speed.

Malfunction of the catalyst exists if the two following conditions are met simultaneously:

I. $\Delta T$ is positive and greater than a limit value for the temperature difference $\Delta T_L$ to be specified for the engine and catalyst type in question, that is to say the current exhaust gas temperature $T_E$ is more than this limit value above the light-off temperature for CO of the fresh catalyst $T_{CO,50\%,fresh}$:

$$T_E > T_{CO,50\%,fresh} + \Delta T_L \quad (4)$$

II. the degree of conversion $r_{CO}$ for carbon monoxide is below a degree of conversion limit $r_{CO,L}$ to be specified for the engine and catalyst type:

$$r_{CO} < r_{CO,L} \quad (5)$$

The degree of conversion limit $r_{CO,L}$ can be, for example, 50%.

However, recording of an individual malfunction is not yet sufficient for establishing permanent damage to the catalyst. Since replacement of a catalyst is associated with high costs for the owner of the vehicle, premature classification of the catalyst as seriously damaged must be avoided for as long as possible.

The catalyst is therefore only evaluated as permanently damaged if a malfunction is found for several operating points of the engine. Mappings with the operating data of the engine for a grid of discrete operating points are as a rule stored permanently in the engine control system. Not all these operating points are equally suitable for evaluating the operability of the catalyst. Thus, for example, operating points with high exhaust gas temperatures are unsuitable, since even a damaged catalyst can still deliver good conversions for carbon monoxide at high exhaust gas temperatures. Only a selection of the possible operating points which are particularly critical is therefore preferably used for evaluating the catalyst. The number of operating points selected for evaluating the catalyst is designated $n_S$ in the following. Mappings with the particular light-off temperatures $T_{CO,50\%,fresh}$ for carbon monoxide for the fresh catalyst are stored in the OBD electronics for the operating points selected.

The catalyst is then considered seriously damaged if a malfunction is found for a particular number $n_M$ of the operating points selected. The operating points for which a malfunction is found and their number can be stored and totalled over several driving cycles. Only when the number $n_M$ of operating points with malfunctions is exceeded is a signal for replacement of the catalyst given.

A further safeguard against premature classification of the catalyst as damaged can be obtained if it is specified that the number $n_M$ of operating points with malfunctions of the catalyst must occur within a time interval $\Delta t_M$ which is to be preset.

The permitted number $n_M$ of operating points with a malfunction of the catalyst, the number of operating points selected $n_s$ and their position, the time interval $\Delta t_M$ and the size of the parameters $\Delta T_L$ and $r_{CO,L}$ also depend on the OBD legislation regulations, in addition to the engine and catalyst type. According to the invention it is possible not to specify the parameters $\Delta T_L$ and $r_{CO,L}$ as constant values, but to store them in the form of mappings in the OBD electronics as a function of the load and speed.

Figure 3:
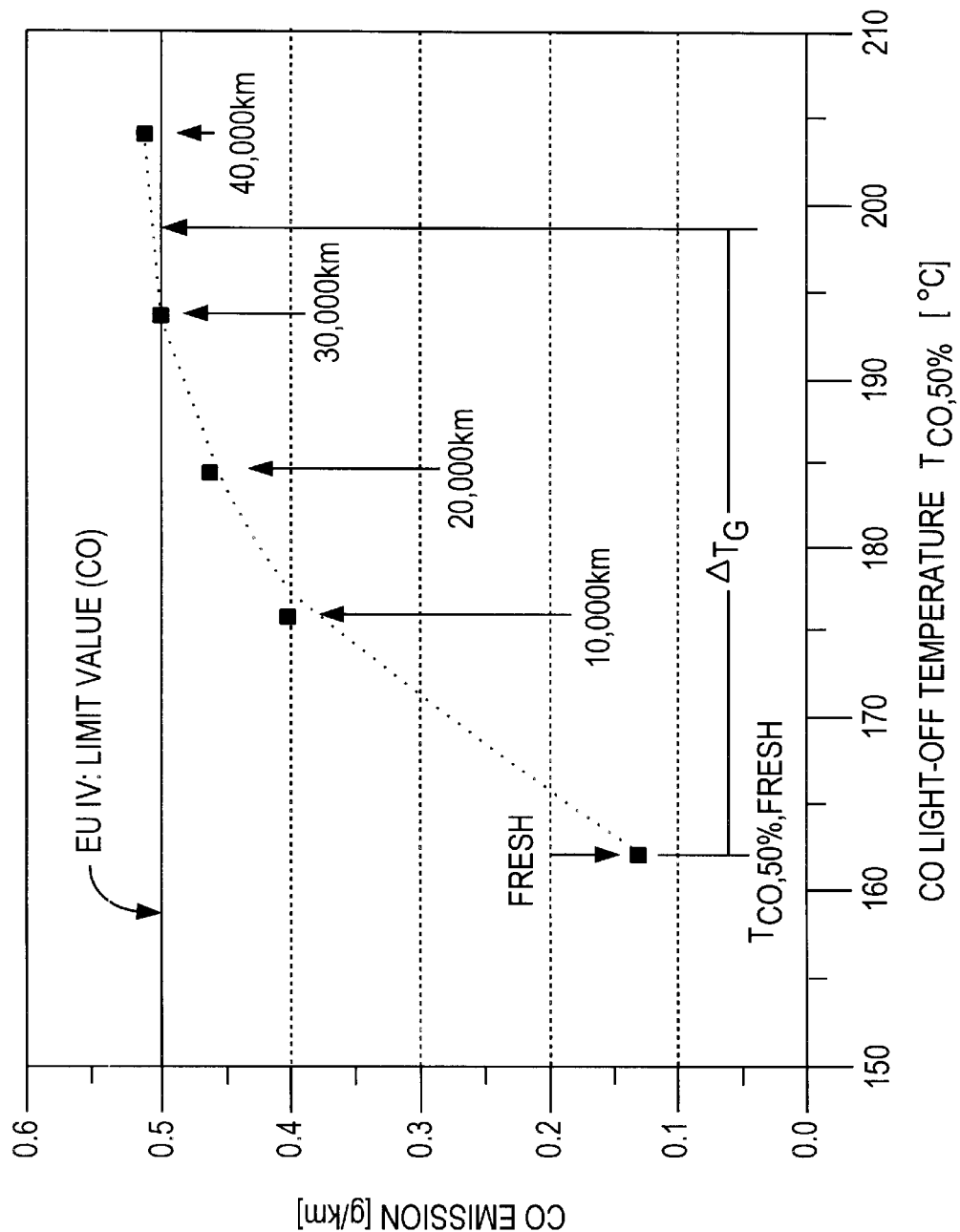
FIG. 3 is a graph which shows CO emissions during an MVEG-A/2 driving cycle as a function of the light-off temperature of the catalyst for carbon monoxide.

The typical carbon monoxide emissions of a vehicle measured during a defined driving cycle (MVEG-A/2) as a function of the CO start-up or light-off temperature $T_{CO,50\%}$ measured for a diesel oxidation catalyst at various ageing stages in continuous operation are shown in FIG. 3 as an example. In emission legislation, maximum emissions within a driving cycle are specified. In Europe the maximum permitted emission of CO in the MVEG-A/2 cycle starting from the year 2005 (EU IV standard) is 0.5 g/km. Due to ageing of the catalyst, the light-off temperature $T_{CO,50\%}$ of the catalyst increases, an increase in the emissions in the driving cycle correlating with this. After a driving output of 40,000 km, the EU IV limit values re no longer met for the example shown in FIG. 3. The limit value $\Delta T_L$ of the temperature difference $\Delta T$ can now be chosen such that the catalyst is just considered seriously damaged according to the above conditions when the legal emission limit values are exceeded. Alternatively, instead of the emission limit values, OBD limit values to be defined by legislators can also be used.

The curve shown in FIG. 3 as an example varies according to the design of the catalyst, driving behaviour, vehicle type and engine type. By varying the limit value $\Delta T_L$ of the temperature difference $\Delta T$, the OBD process described here can be matched to all vehicle types, engine types and legislation regulations.

Figure 4:
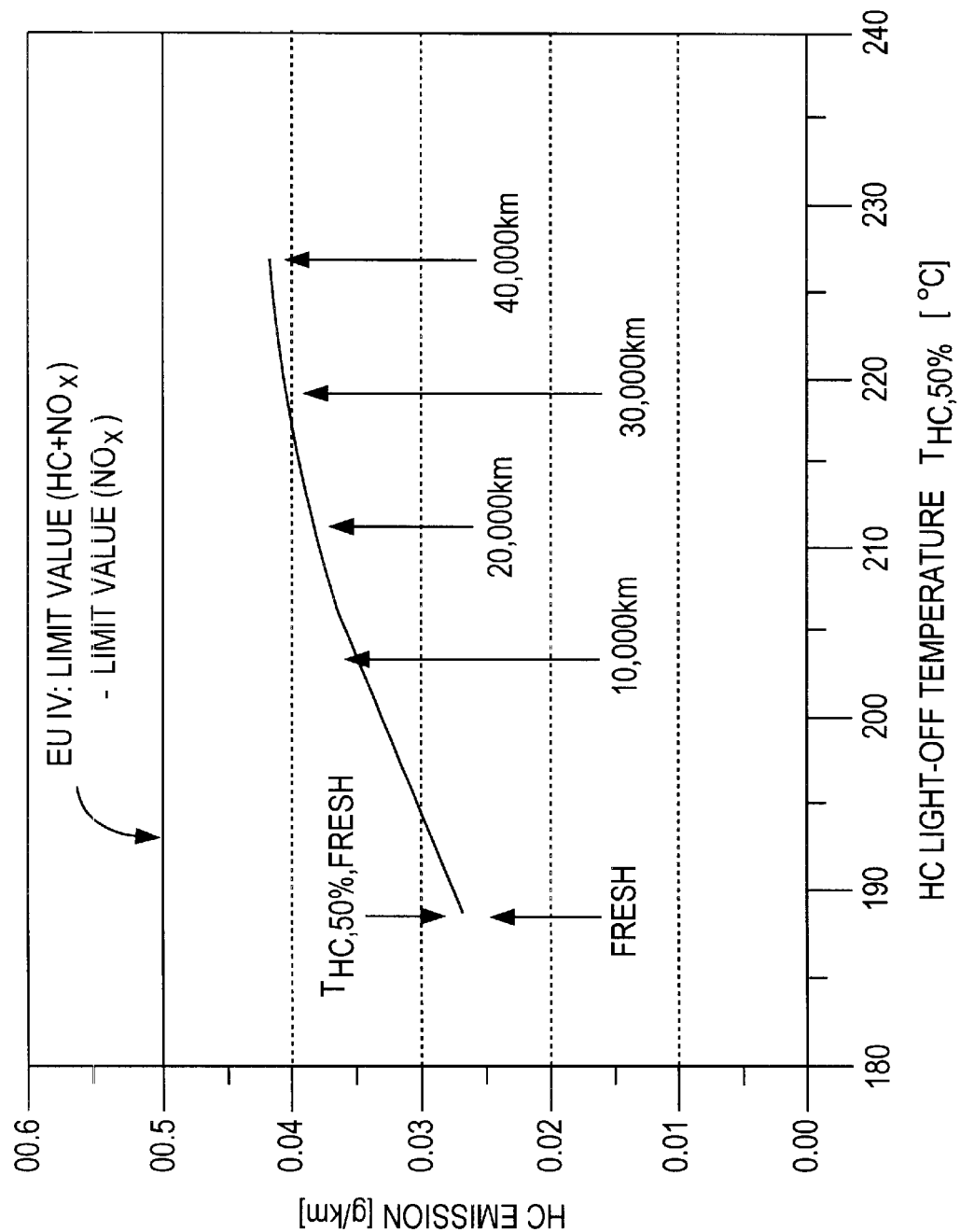
FIG. 4 is a graph, which shows HC emissions during an MVEG-A/2 driving cycle as a function of the start-up or light-off temperature of the catalyst for hydrocarbons.

FIG. 4 shows the graph corresponding to FIG. 3 for the behaviour of the hydrocarbon emissions in the same ageing procedure recorded on the same vehicle under identical measurement conditions. Since no fixed limit value for HC emissions is given in European legislation, but instead there are two limit values, one for the total of $NO_X$ and HC emissions and one for the $NO_X$ emission, the difference between these two limit values is drawn as the limit line for HC emissions in FIG. 4. FIG. 4 shows that the HC light-off temperature $T_{HC,50\%}$ of the catalyst on ageing during continuous operation does not rise to the same extent as the CO light-off temperature $T_{CO,50\%}$. Furthermore, the increase in the HC light-off temperature $T_{HC,50\%}$ is not associated with an increase in emissions to the extent as is the case with carbon monoxide; thus, for example, the difference between the two limit values for HC+NOx and NOx itself is not exceeded even after continuous operation of the vehicle for 40,000 km. CO is therefore chosen according to the invention as the indicator pollutant for testing the catalyst.

If the above conditions 1 and 2 are met at the defined operating points within the time interval $\Delta t_M$, and if the catalyst is thus considered seriously damaged, a signal can be given to the driver as a malfunction warning for the damaged catalyst. In addition, the malfunction diagnosis, that is to say the time the malfunctions occurs and the associated operating points of the engine, can be stored in the OBD electronics. The individual simultaneous fulfilment of conditions 1 and 2 over a longer interval of time than $\Delta t_M$, or in the case of a lower number of operating points than $n_M$, that is to say if serious damage is not present, can also be stored in the OBD electronics for later workshop diagnoses, without a malfunction signal being transmitted to the driver.

Figure 5:
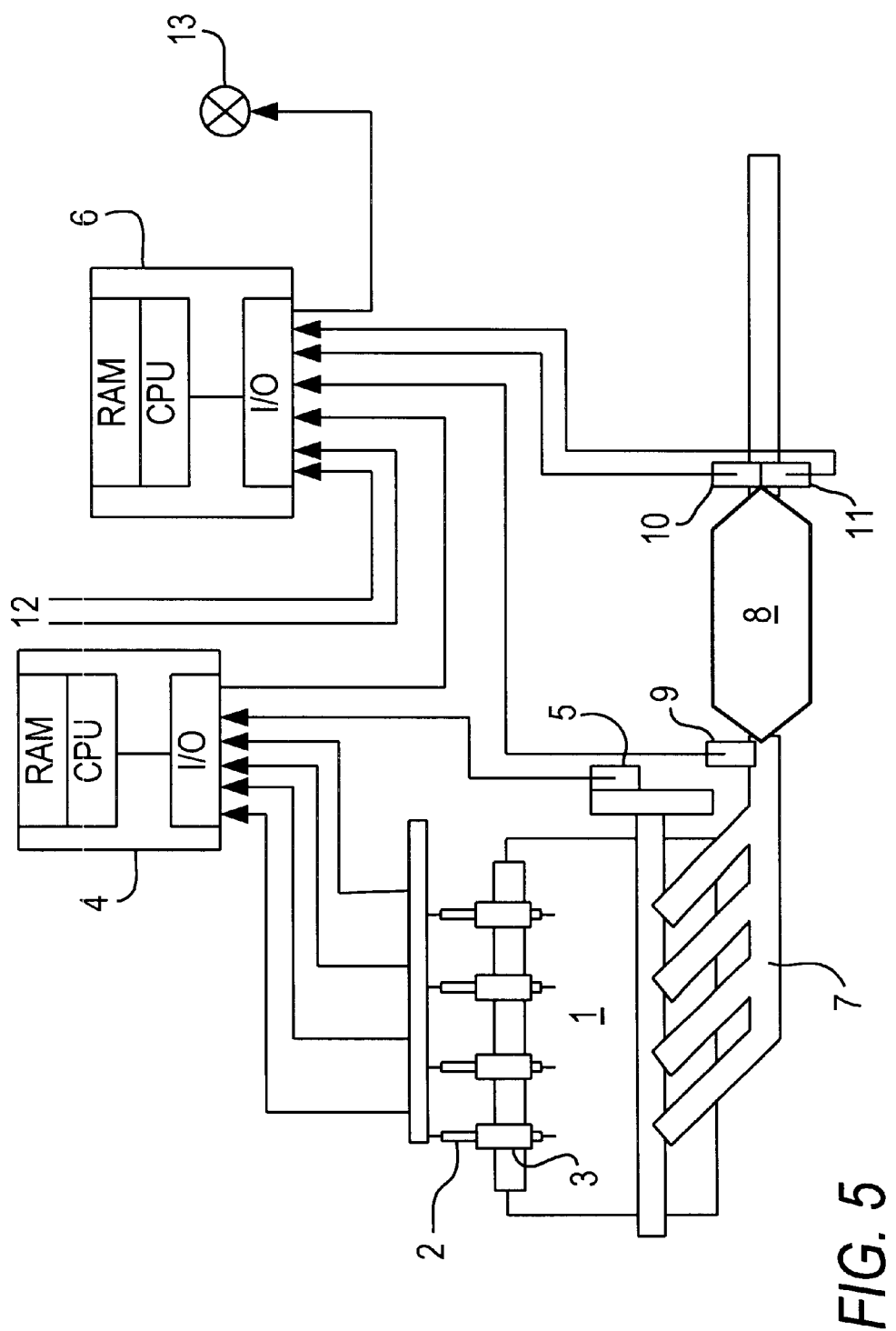
FIG. 5 is a schematic representation of the construction of an exhaust gas purification system for carrying out the process according to the invention.

FIG. 5 serves to further explain the invention. It shows a block diagram for carrying out the process of the invention. Reference number (1) designates the diesel engine in which fuel is introduced through an injector system (2). The amount of fuel injected in is measured by suitable sensors (3) and transmitted to the engine electronics (4), which have a data port (I/O), a processor (CPU) and a memory (RAM). The engine electronics furthermore constantly receive information about the current engine speed via a suitable sensor system (5), so that the load can be calculated from the amount of fuel injected in and the engine speed by comparison with the engine map stored in the engine electronics. This operating point information consisting of the load and engine speed is transmitted to the OBD electronics (6), which also have a data port (I/O), processor (CPU) and memory (RAM). The exhaust gas of the engine is passed via the exhaust gas line (7) to the exhaust gas purification converter (8), in which a suitable catalyst is arranged. Reference numbers (9) and (10) designate the sensors for carbon monoxide, the concentration of which is measured upstream and downstream of the catalyst to determine the degree of conversion, the sensor (9) being optional, depending on the embodiment of the process. A temperature probe (11) is arranged in the immediate spatial vicinity of the sensor (10) in the exhaust gas system. The signals of the CO sensors (9) and (10) and those of the temperature probe (11) are transmitted to the OBD electronics (6). The OBD electronics receive via further sensors and signal lines (12) information on all other exhaust gas-relevant components of the engine, of the fuel systems and of the exhaust gas system. With the aid of the measurement values and the criteria described above, the OBD electronics decide whether the catalyst still has an adequate catalytic activity or is seriously damaged and must be replaced. Malfunction diagnoses are stored in the memory of the OBD electronics and serious catalyst damage is indicated by a warning lamp (13).

Figure 6:
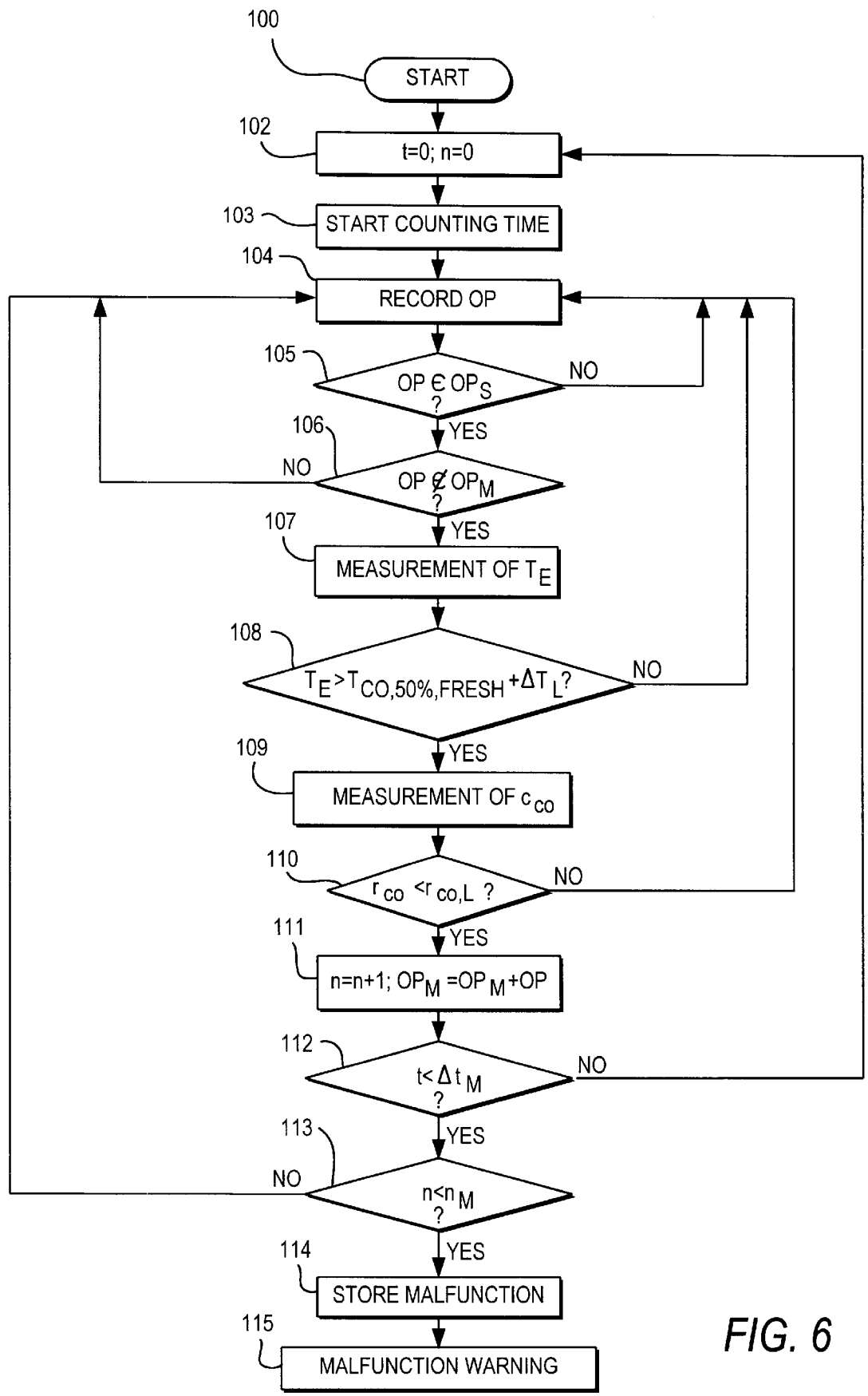
FIG. 6 shows a flow chart for the process according to the invention

FIG. 6 explains by way of example with the aid of a flow chart how serious damage to the catalyst can be detected by the process according to the invention.

Reference number (100) designates the start of the process, which is monitored and controlled by an operating program stored in the OBD electronics. In step (102) the elapsed time t and the number n of operating points stored with a malfunction of the catalyst are first set at zero. In step (103) the time measurement is started, after which in step (104) the current engine operating point (OP) is recorded from the load and speed.

In step (105) it is tested whether the current operating point is an element from the amount of $OP_S$ ($OP \in OP_S$?) of operating points selected for the evaluation of the catalyst and stored in the OBD electronics. If this is not the case, the procedure is continued with recording of a new operating point (104). Otherwise, in step (106) it is tested whether the current operating point OP already belongs to the amount of operating points $OP_M$ stored so far for which a malfunction of the catalyst has been found, or differs from these. If a malfunction has already been found once for this operating point, the procedure is continued with step (104). Otherwise, in step (107) measurement of the current exhaust gas temperature $T_E$ after the catalytic converter is carried out.

In step (108) it is then tested whether the current exhaust gas temperature $T_E$ is greater than the sum of the CO light-off temperature $T_{CO,50\%,fresh}$ of the fresh catalyst and the limit value of the temperature difference $\Delta T_L$. If this is not the case, the procedure is continued with recording of a new operating point in step (104). Otherwise, in step (109) the carbon monoxide concentration is measured.

In step (110) the degree of conversion $r_{CO}$ for CO is determined and it is tested whether this is below the degree of conversion limit $r_{CO,L}$. If this is not the case, the procedure is likewise continued with recording of a new operating point in step (104). Otherwise, the current operating point OP is stored in the OBD electronics in step (111), that is to say it is added to the amount of operating points $OP_M$ ($OP_M = OP_M + OP$) for which a malfunction of the catalyst has already been found beforehand. The number n of operating points stored with malfunction is furthermore increased by one.

In step (112) it is tested whether the time which has passed since step (103) is shorter than the time interval $\Delta t_M$. If the time interval is exceeded, the procedure is continued with step (102), that is to say the counting of the time and the operating points stored with malfunctions are reset. On the other hand, if the time interval has not yet been exceeded, in step (113) it is tested whether the permitted number $n_M$ of operating points with malfunction is already reached. If this is not yet the case, the procedure is continued with recording of further operating points in step (104). If the permitted number of operating points is exceeded, in step (114) this is stored as serious damage to the catalyst in the OBD electronics and in step (115) a malfunction signal is emitted.

Further modifications and variations will be apparent to those skilled in the art from the foregoing and are intended to be encompassed by the claims appended hereto.

German application 100 13 893.4 is relied on and incorporated herein by reference.

We claim:

1. A process for checking the operability of a catalyst for purification of the exhaust gases of a combustion engine during operation of the engine, wherein the catalyst comprises a light-off temperature $T_{CO,50\%}$ and a conversion ratio $r_{CO}$ for carbon monoxide and the combustion engine is equipped with an electronic control system comprising engine electronics and OBD electronics and wherein a malfunction of the catalyst exists at an operation point of the engine if the conversion ratio $r_{CO}$ for carbon monoxide is below a limit value $r_{CO,L}$ while simultaneously the exhaust gas temperature $T_E$ is by an amount $\Delta T_L$ larger than the light-off temperature $T_{CO,50\%,new}$ of the new catalyst.

2. A process according to claim 1, wherein the conversion ratio $r_{CO}$ for carbon monoxide is determined as:

$$r_{CO} = 1 - \frac{c_{CO,2}}{c_{CO,1}},$$

wherein $c_{CO,2}$ is the measured concentration of carbon monoxide in the exhaust gas after the catalyst and $c_{CO,1}$ is the measured concentration of carbon monoxide before the catalyst.

3. A process according to claim 1, wherein the conversion ratio $r_{CO}$ for carbon monoxide is determined as:

$$r_{CO} = 1 - \frac{c_{CO,2}}{c_{CO,engine}},$$

wherein $c_{CO,2}$ is the concentration of carbon monoxide in the exhaust gas after the catalyst and $c_{CO,engine}$ is the concentration of carbon monoxide stored as performance characteristic of the corresponding engine operation point in the electronic OBD system.

4. A process according to claim 1, wherein a malfunction of the catalyst is registered in the OBD-electronics.

5. A process according to claim 4, wherein determination of malfunction of the catalyst is done at a selection of operation points.

6. A process according to claim 5, wherein the catalyst is rated severely damaged if a number of operation points for which a malfunction was found exceeds a preset permissible number $n_M$ of operation points with catalyst malfunction.

7. A process according to claim 5, wherein the catalyst is rated severely damaged if the number of operation points for which a malfunction was found exceeds a preset permissible number $n_M$ of operation points with catalyst malfunction during a preset time interval $\Delta t_M$.

8. A process according to claim 6, wherein when the catalyst is rated severely damaged, a signal for replacing the catalyst is given.

* * * * *